United States Patent [19]
Budde et al.

[11] Patent Number: 5,948,920
[45] Date of Patent: Sep. 7, 1999

[54] EPOXIDES FROM DICYCLOPENTADIENE—UNSATURATED OIL COPOLYMERS

[75] Inventors: Fred Budde, Saint Paul; Mohammed R. Kazemizadeh, Blooming Prairie, both of Minn.; Walter P. Kosar, Jr., Pottstown, Pa.

[73] Assignee: Elf Atochem North America, Inc., Philadelphia, Pa.

[21] Appl. No.: 08/956,809

[22] Filed: Oct. 23, 1997

Related U.S. Application Data

[60] Provisional application No. 60/032,657, Dec. 11, 1996.

[51] Int. Cl.$^6$ .............................. C07D 301/14; G21F 1/10
[52] U.S. Cl. ............................................. 549/528; 523/136
[58] Field of Search ............................... 549/528; 523/136

[56] References Cited

U.S. PATENT DOCUMENTS

| | | | |
|---|---|---|---|
| 4,647,678 | 3/1987 | Eckwert et al. | 549/528 |
| 5,288,805 | 2/1994 | Kodali | 525/190 |
| 5,328,940 | 7/1994 | Zimmer | 522/31 |

FOREIGN PATENT DOCUMENTS

| | | | |
|---|---|---|---|
| 0 055 387 A1 | 10/1981 | European Pat. Off. | 301/14 |
| 0 300 163 A1 | 7/1987 | European Pat. Off. | 301/14 |
| 88 10 8298 | 12/1988 | European Pat. Off. | 301/14 |

OTHER PUBLICATIONS

Abstract of GB 88–30071 Dec. 1988 Great Britain.

*Primary Examiner*—Alan L. Rotman
*Assistant Examiner*—Charanjit S. Aulakh
*Attorney, Agent, or Firm*—Stanley Marcus; Royal E. Bright

[57] ABSTRACT

Partially epoxidized compounds obtained from Diels Alder adducts of dicyclopentadiene with fatty oils having a iodine number of 70 or greater and their transesterification products with $C_1$ to $C_{10}$ alkanols are disclosed. 100% solids radiation and heat curable coating compositions containing the epoxidized compounds and/or their transesterification products are also disclosed.

4 Claims, No Drawings

EPOXIDES FROM DICYCLOPENTADIENE—UNSATURATED OIL COPOLYMERS

This application claims priority from Provisional Application Ser. No. 60/032,657 filed Dec. 11, 1996.

BACKGROUND OF THE INVENTION

This invention relates to compositions of matter classified in the art of chemistry as epoxides or epoxy derivatives, more specifically, as 1,2 oxides derived from organic compounds having carbon to carbon unsaturated bonds, more specifically as epoxides of adducts of unsaturated fatty oils and still more specifically as epoxides of copolymers of dicyclopentadiene (DCPD) and unsaturated fatty oils having an original iodine number of at least about 70, to compositions containing them and to processes for their preparation and use.

PRIOR ART

Dicyclopentadiene copolymers with unsaturated oils are known. See, for example, U.S. Pat. No. 5,288,805.

Epoxidation of various natural products such as essential oils, olefins, terpenes and the like using per acids is known. See European Patent Applications 81109418.4 and 88108298.6, and U.S. Pat. No. 4,647,678.

Polymers of linseed oil and dicyclopentadiene have been employed in various mixtures with epoxy polymers for curable putties and the like. See Abstract of U.K. Patent Application 2226317.

Epoxidation, fully or partially, of the dicyclopentadiene adduct of any unsaturated oil for any purpose has not been suggested anywhere.

SUMMARY OF THE INVENTION

The invention provides in a first composition aspect, an epoxidized product selected from the group consisting of:

A. The epoxide resulting from the epoxidation of a dicyclopentadiene copolymer composition produced by treating a fatty oil selected from the group consisting of fatty oils having an iodine number equal to or greater than about 70 and mixtures of said oils with dicyclopentadiene under conditions such that the oil comprises from 70 to 90 weight percent of the reaction mixture and the dicyclopentadiene comprises from about 30 to about 10 weight percent of the reaction mixture, the copolymer mixture having a viscosity in the range from about 500 to about 10,000 cps at 25° C.;

B. The epoxide resulting from the transesterification of the epoxide of A with one or more saturated mono and polyhydroxy alcohols having from one to about 10 carbon atoms;

C. The epoxide resulting from
  i) transesterifying a fatty oil selected from the group consisting of fatty oils having an iodine number equal to or greater than about 70 and mixtures of said oils with one or more saturated mono and polyhydroxy alcohols having from one to about 10 carbon atoms,
  ii) treating the transesterification product of step C (i) with dicyclopentadiene under conditions that said transesterification product comprises from 70 to 90 weight percent of the reaction mixture and the dicyclopentadiene comprises from about 30 to about 10 weight percent of the reaction mixture to produce a copolymer mixture having a viscosity in the range of from abouuoh t 500 cps to about 10,000 cps at 25° C., pe1 50and
  iii) epoxidizing the copolymer mixture of step C (ii); and D. The epoxide resulting from
  i) transesterifying the dicyclopentadiene copolymer composition of A with one or more saturated mono and polyhydroxy alcohols having from one to about 10 carbon atoms, and
  ii) epoxidizing the transesterification product of step D(i).

The tangible embodiments of the composition aspect of the invention possess the inherent chemical and physical characteristics of being non volatile oily liquids and when examined by standard titrimetric, infra red spectroscopic and viscosity measurement techniques, the compositions sought to be patented exhibit acid values, iodine values, oxirane content, infra red spectra and viscosity values positively confirming the structure sought to be patented.

The first composition aspect of the invention possesses the inherent applied use characteristic of being suitable as a radiation or thermally curable diluent for radiation curable or thermally curable 100% solids inks and coatings respectively.

The invention provides in a second composition aspect a liquid composition suitable for providing a radiation curable coating on a substrate, said composition consisting essentially of an otherwise conventional 100% solids radiation curable coating composition containing as a diluent at least one composition of the first composition aspect of the invention.

DETAILED DESCRIPTION OF THE INVENTION

The manner of making and using the invention so as to enable one of skill in the art to practice same will now be described with reference to a specific embodiment thereof namely the partial epoxide of the dicyclopentadiene adduct of linseed oil.

Dicyclopentadiene adducts of linseed oil are commercially available under the tradename Dilulin from Cargill, Inc. This is the preferred starting material.

Another similar but higher viscosity product is available from Archer Daniels Midland as ML189.

A typical synthesis of preferred products is given in U.S. Pat. No. 5,288,805.

One of skill in the art will recognize that analogous dicyclopentadiene adducts of any of the unsaturated fatty oils contemplated as starting materials for the practice of the invention may be prepared by analogous processes and that such adducts will be the full equivalents of the linseed oil adducts in the to be described epoxidation processes, the coating compositions and the use processes of this invention.

Typical fatty oils contemplated as starting materials by the invention are: castor oil, olive oil, peanut oil, rapeseed oil, corn oil, sesame oil, cottonseed oil, soybean oil, sunflower oil, hemp oil, tung oil, oiticica oil, lard oil having an iodine number of about 70 or greater, neat's foot oil having an iodine number of about 70 or greater, whale oil and fish oil.

Epoxidation of the DCPD adduct of the fatty oil (in this case linseed oil) may be performed by known methods such as reaction with organic peracids. These acids may be preformed or formed in situ. Suitable preformed peracids include peracetic acid, perpropionic acid and perbenzoic acid. In situ epoxidation may be accomplished by using hydrogen peroxide and a low molecular weight carboxylic acid such as acetic acid or formic acid. Hydrogen peroxide in the presence of acetic acid and a strong acid such as sulfuric acid or ion exchange resin in the acid form may also be used for epoxidation. Epoxidation may be conducted neat or in an inert solvent which will not interfere with the course of the reaction, such as halogenated solvent, aromatic solvent or saturated hydrocarbon solvent. Epoxidation may be performed between about 0° to about 90° C. and reaction time may be from about 0.1 to about 36 hours. In an in situ reaction, when employing hydrogen peroxide and acetic acid together with sulfuric acid, the product which results may be a mixture of epoxide and hydroxy ester. Due to the side reaction, it is preferable to carry out the epoxidation at the lowest possible temperature and shortest time and to use solvent. Preformed peracids such as peracetic or perpropionic acid are preferred.

The epoxidation also may be accomplished by treatment of the adduct of the fatty oil in the presence of complexes of transition metals such as, but not limited to, molybdenum and tungsten, titanium, rhenium, vanadium, or manganese and organic peroxides such as t-butylhydroperoxide or in the presence of hydrogen peroxide. Such metal complexes may be homogeneous or supported on inorganic oxide supports such as silica or zeolites or organic polymer resins.

In order for the epoxidized compounds of the invention to be useful in radiation curing formulations they may be epoxidized on some or all of the available ethylenic unsaturated bonds, epoxide (oxirane) content of between 0.5 to 9.2% by weight is required. The preferred range is 3–7.2% oxirane. The low viscosity of the compounds of the invention permits them to replace the solvent in ink and coating formulations and because they participate in the curing process permit the formulation of 100% solid radiation curable coatings having viscosities in the preferred range for formation of good coatings.

The epoxidized transesterification esters of the DCPD adducts of the fatty oils contemplated as part of the first composition aspect of the invention may be prepared in two alternative ways and standard transesterification techniques well known in the art are contemplated for use in both alternatives. In the first alternative, the epoxidized fatty oil adduct may be transesterified using any of the $C_1$ to $C_{10}$ mono or polyols contemplated by the invention using standard transesterification techniques. In the second, the fatty oil or the fatty oil DCPD adduct may first be transesterified with any of the $C_1$ to $C_{10}$ mono or polyols contemplated by standard methods and the esters thus formed may optionally first be treated with DCPD (if necessary) and then epoxidized in the same manner as described for the epoxidation of the original fatty oil DCPD adduct.

The printing ink compositions of the present invention generally will comprise from 10 to 70 percent by weight of an radiation curable epoxidized viscous liquid polymer having a viscosity of less than 5000 cp at 50% solids in toluene and from 4 to 40 percent by weight of a color and pigment which provides the ink with its color so that it can be seen. Examples of color pigments which can be used herein include carbon black, phthalo blue, azoic yellow, and any other commonly used pigment for inks.

In addition to the above two components, it may be advantageous to include a high glass transition temperature ($T_g$) resin in the composition. We have found that high $T_g$ epoxy resins are highly compatible with and cure very well with the polymers of the present invention. Such high $T_g$ epoxy resins include UVR-6110 epoxy resin made by Union Carbide. When a high $T_g$ resin is used, it may comprise from 0 to 60 percent by weight of the overall composition.

Standard reactive (radiation curable) diluents then can be added to radiation curable inks include alcohols, vinyl ethers, epoxides, acrylate and methacrylate monomers, oligomers and polymers. They may also be blended with other diene-based polymers. Examples of epoxides include bis(2, 3-epoxycyclopentyl) ether, vinylcyclohexenedioxide, limonene dioxide, epoxidized soya and linseed oils and fatty acids. Vernonia oil has been found to cure well with epoxidized polymers. The epoxidized products of the present invention may be substituted in whole or in part for these diluents. The reactive diluent may comprise from 0.1 to 30 percent by weight of the composition.

The composition may also contain from 0 to 3 percent by weight of a flow modifier which can prevent fisheyes and craters, and aid in wetting or film smoothness or gloss, such as Cabosil M-5 fumed silica and C-430 fluorocarbon surfactant from 3M. The composition may contain from 0 to 1 percent by weight of a defoamer and 0 to 2 percent by weight of a dispersant. Photo-initiators may be used. If they are, they may comprise from 0 to about 10 percent by weight of the composition.

The compositions of this invention are preferably cured by ultraviolet or electron beam radiation, but radiation curing utilizing a wide variety of electromagnetic wavelength is feasible. Either ionizing radiation such as alpha, beta, gamma, X-rays and high energy electrons or nonionizing radiation such as ultraviolet, visible, infrared, microwave and radio frequency may be used.

The most common source of alpha, beta and gamma radiation are radioactive nuclei. A ionizing radiation source with commercial polymer cross-linking application is gamma radiation that is produced from either cobalt-60 or cesium-137 radioactive nuclei. X-rays can be produced through deceleration of high speed electrons through the electric field of an atomic nucleus.

High voltage electron accelerators are preferred over gamma radiation and certain types of X-ray processing equipment. High energy electrons produced by machine acceleration, as opposed to radioisotopes, can be applied easily to industrial processes for the following reasons: easy on-off switching capability; less shielding is required than with gamma radiation; accelerator beams are directional and less penetrating than gamma or X-rays; and electron radiation provides high dose rates, i.e. maximum penetration per unit density of material, and is well suited for on-line, high speed processing applications. Commercially available high or low energy electron-processing equipment are the Dynamitron (Dynamitron is a trade mark) device, dynacote, insulating-core transformer, linear accelerator, Van de Graaff accelerator, pelletron, laddertron and linear cathode. Manufacturers of high voltage electron-accelerator equipment are High Voltage Engineering Corporation, Burlington, Mass. and Radiation Dynamics, Inc., Westbury, N.Y. Manufacturers of low energy electron beam generating equipment include American International Technologies, Inc., of Torrance, Calif.; RPC Industries of Hayward, Calif.; and Energy Sciences of Wilmington, Mass.

Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

Visible light sources can be obtained from high pressure mercury arcs by addition of rare gases or metal halides, which increase the number of emission lines in the 350–600 nm region of the spectrum. Fluorescent lamps, tungsten halide lamps and visible lasers may also be utilized.

The amount of radiation necessary for high gel formation varies with the thickness of the polymeric mass being irradiated, the amount of epoxy functionality, the extent to which the epoxy functionality is concentrated in specific regions within the polymeric mass and the type of radiation utilized. When electron beam radiation is utilized, radiation doses of 0.1 Mrads to 5 Mrads are preferred.

When using non-ionizing radiation it is necessary to employ a photoinitiator to initiate the cross-linking reaction. Useful photoinitiators include diaryliodonium, alkoxy-substituted diaryliodonium, triarylsulfonium, dialkylphenacylsulfonium, and dialkyl-4-hydroxyphenylsulfonium salts. The anions in these salts generally possess low nucleophilic character and include $SbF_6^-$, $BF_4^-$, $B(ArF)_4^-$ (where ArF is fluorinated aryl), $PF_6^-$ and $AsF_6^-$. Specific examples include (4-octyloxy-phenyl)-phenyl-iodonium hexafluoroantimonate GE UV 9392C, UVI-6990 (from Union Carbide), and FX-512 (3M Company). $(C_6H_5)_2I^+B(C_6F_5)_4^-$ from Rhone Poulenc, UVI-6974, an aryl sulfonium salt from Union Carbide, and UV 9392C from GE are especially effective. The salts can be used alone or in conjunction with a photosensitizer to respond to long wave length UV and visible light. Examples of photosensitizers include thioxanthone, anthracene, perylene, phenothiazine, 1,2-benzathracene coronene, pyrene and tetracene. the photoinitiator and photosensitizer are chosen to be compatible with the polymer being cross-linked and the light source available.

The printing ink compositions of the present invention may be used in a wide variety of printing ink applications. Some of these applications include flexographic and gravure inks, letter press inks, and screen inks. A preferred use is for lithographic inks, especially radiation cured lithographic inks.

The following examples further illustrate the best mode contemplated by the inventors for the practice of their invention. The examples are to be construed as illustrative of and not in limitation of the invention.

EXAMPLE 1

Preparation of Dilulin Epoxide

Dilulin (258 grams) having an Iodine Value (IV) of 165 is charged into a reactor. Tetrachloroethylene (300 grams) is added and the mixture is stirred. Then, 20% formic acid (48 grams) is added. The temperature is slowly increased to 60° C. and the reaction stirred at about 120 rpm. After the temperature reaches 60° C., 70% hydrogen peroxide (95 grams) is added over a period of 2 hours. The reaction mixture is continuously stirred for an additional 3 to 4 hours. After the iodine value (IV) of the reaction mixture drops into the 80 to 100 range, the reaction mixture phases are allowed to separate, the aqueous phase is discarded and the oil phase is given a water wash followed by solvent stripping under vacuum. The finished epoxidized oil will have an oxirane content of between 2.5 and 3.5 and viscosity of from 1200 to 2000 cps. The oxirane content and viscosity can be increased by continuing to add more hydrogen peroxide for an additional period of stirring time. The reaction can be stopped at any time prior to or when the IV reaches a value of about 10.

EXAMPLE 2

In this example Dilulin epoxide, which is in the form of a triglyceride, is converted to the methyl ester of the constituent epoxidized adducts of the individual fatty acids. The known trans esterification methods reported in the literature may be applied. Another approach to prepare epoxidized methyl esters from Dilulin is to prepare the methyl esters of the acid adducts in Dilulin first and then epoxidize the mixed esters as explained in the example above.

Dilulin epoxide (oil from example 1) 260 grams is charged into a reactor. 53 grams methanol containing 1.1 grams KOH is added and the mixture stirred. The reaction temperature is raised to 66° C. and maintained for one hour. The reaction is terminated by adding glacial acetic acid, the glycerin by-product is washed out with water and the methyl esters mixture is dried under vacuum. An oil having an oxirane content between 2.5 and 3.5 and a viscosity range of 400 to 1000 cps is obtained. The oxirane content and viscosity of the methyl ester mixture is directly dependent on the oxirane content and the viscosity of the dilulin epoxide. In the transesterification of dilulin epoxide, one of skill in the art will understand that bases such as NaOH, sodium methoxide and like bases may also be employed.

One of skill in the art will recognize that in addition to the process using methanol to prepare methyl esters described in the above Example 2, analogous processes employing any $C_2$ to $C_{10}$ saturated straight, branched chain or cyclic mono or polyhydroxy alcohol to provide the other $C_2$ to $C_{10}$ saturated alcohol esters contemplated by the invention may be employed.

Illustrative, but not limiting, $C_2$ to $C_{10}$ monohydroxy alcohols are ethyl, n-propyl, i-propyl, n-, s-,i, and t-butyl, as well as the various isomers of pentanol, hexanol (including cyclohexanol), heptanol, octanol, nonanol and decanol. Illustrative $C_2$ to $C_{10}$ polyhydroxy alcohols are ethylene glycol, propylene glycol, pentaerythrytol, sorbitol, 1,3-propanediol, hexylene glycol, cyclohexanediol.

EXAMPLE 3

U.V. Curable Printing Ink Formulation

Polymer 101 is an epoxidized (I—$B_n$) divinylbenzene star polymer having a molecular weight of 100,000, arm molecular weights of 5800 and an epoxy equivalent weight of 440 with most of the epoxides concentrated in the I (isoprene) block. The viscosity of polymer 101 is about 1900 cps at 50% in toluene. Prepare an ink by mixing the following ingredients and then dispersing in a yellow pigment using a standard laboratory mixer with an impeller mixing head.

TABLE

| Ingredients | Parts per Hundred |
| --- | --- |
| Polymer | 20.00 |
| UVR 6110 (Union Carbide) | 45.00 |
| Product of Example 1 | 16.00 |
| Fluorad FC-430 (3M) | 1.00 |
| BYK P104S (BYK Chemie) | .05 |
| UVI 6974 (Union Carbide) | 8.00 |
| Azoic Yellow | 7.00 |
|  | 97.50 |

To cast a thick film of the ink formulation, about 10 percent of tetrahydrofuran is mixed in. A thick film is cast with a doctor blade onto a 1 mil Mylar film and the tetrahydrofuran allowed to evaporate. Prebake the film at 121° C. and then UV cure using a photocure processor equipped with a single medium pressure mercury lamp using a 30 feet per minute belt speed. No post-bake is required. The liquid film will cure to a nontacky yellow film with excellent adhesion to the Mylar and with excellent flexibility. The film will be able to be creased sharply and will look excellent through the Mylar. It will also have excellent resistance to toluene.

The subject matter which applicants regard as their invention is particularly pointed out and distinctly claimed as follows:

We claim:

1. An epoxidized product selected from the group consisting of:

A. the epoxide resulting from the partial epoxidation of a dicyclopentadiene copolymer composition produced by treating a fatty oil selected from the group consisting of fatty oils having an iodine number of greater than about 70 and mixtures of said fatty oils with dicyclopentadiene under conditions such that the fatty oil comprises from about 70 to 90 weight percent of the reaction mixture and the dicyclopentadiene comprises from about 10 to about 30 percent of the reaction mixture, the copolymer composition having a viscosity in the range of from about 500 to about 10,000 cps at 25° C., and B. the epoxide resulting from the transesterification of the epoxide of A with one or more saturated mono and polyhydroxy alcohols of from one to about 10 carbon atoms;

C. The epoxide resulting from
   i) transesterifying a fatty oil selected from the group consisting of fatty oils having an iodine number equal to or greater than about 70 and mixtures of said oils with one or more saturated mono and polyhydroxy alcohols having from one to about 10 carbon atoms,
   ii) treating the transesterification product produced by step C (i) with dicyclopentadiene under conditions that said transesterification product comprises from 70 to 90 weight percent of the reaction mixture and the dicyclopentadiene comprises from about 30 to about 10 weight percent of the reaction mixture to produce a copolymer mixture having a viscosity in the range of from about 500 cps to about 10,000 cps at 25° C., and
   iii) epoxidizing the copolymer mixture produced by step C (ii); and D. The epoxide resulting from
   i) transesterifying the dicyclopentadiene copolymer composition produced and defined in A with one or more saturated mono and polyhydroxy alcohols having from one to about 10 carbon atoms, and
   ii) epoxidizing the transesterification product produced by step D(i).

2. A radiation curable liquid composition comprising:
   a) from 0 to 10 percent by weight photoinitiator,
   b) from 10 to 70 weight percent radiation curable epoxidized liquid polymer having a viscosity of less than 5,000 cps at 50% solids in toluene.
   c) from 0 to 60 percent by weight high glass transition temperature resin, and
   d) from 0.1 to 30 percent by weight epoxidized product defined in claim 1.

3. An epoxidized product as defined in claim 1 wherein the fatty oil selected from the group of fatty oils having an iodine number equal to or greater than about 70 or mixtures thereof consists of one or more fatty oils selected from the group consisting of castor oil, olive oil, peanut oil, rapeseed oil, corn oil, sesame oil, cottonseed oil, soy bean oil, sunflower oil, hemp oil, linseed oil, tung oil, oiticica oil, lard oil having an iodine number of about 70 or greater, neat's foot oil having an iodine number of about 70 or greater, whale oil and fish oil.

4. An epoxidized product as defined in claim 3, wherein the fatty oil consists of linseed oil.

* * * * *